(12) United States Patent
Kang et al.

(10) Patent No.: US 12,703,280 B2
(45) Date of Patent: Aug. 11, 2026

(54) LUMBAR SUPPORT DEVICE FOR IMPROVEMENT OF EXHAUST PERFORMANCE AND CONTROL METHOD THEREOF

(71) Applicant: HYUNDAI TRANSYS INC., Seosan-si (KR)

(72) Inventors: Gu Chang Kang, Hwaseong-si (KR); Sung Hoon Kim, Hwaseong-si (KR)

(73) Assignee: HYUNDAI TRANSYS INC., Seosan-si (KR)

(*) Notice: Subject to any disclaimer, the term of this patent is extended or adjusted under 35 U.S.C. 154(b) by 253 days.

(21) Appl. No.: 18/591,131

(22) Filed: Feb. 29, 2024

(65) Prior Publication Data

US 2024/0300393 A1 Sep. 12, 2024

(30) Foreign Application Priority Data

Mar. 6, 2023 (KR) ........................ 10-2023-0028932

(51) Int. Cl.

| | |
|---|---|
| ***A47C 4/54*** | (2006.01) |
| ***B60N 2/56*** | (2006.01) |
| ***B60N 2/66*** | (2006.01) |
| ***B60N 2/90*** | (2018.01) |

(52) U.S. Cl.

CPC ........... *B60N 2/665* (2015.04); *B60N 2/5642* (2013.01); *B60N 2/976* (2018.02)

(58) Field of Classification Search

CPC ...... B60N 2/914; B60N 2/665; B60N 2/0268; B60N 2/0273; B60N 2/66; B60N 2/99

See application file for complete search history.

(56) References Cited

U.S. PATENT DOCUMENTS 5,263,765 A * 11/1993 Nagashima ........ B60N 2/02246 297/284.6
5,320,409 A * 6/1994 Katoh ................ B60N 2/02246 297/284.6

(Continued)

FOREIGN PATENT DOCUMENTS

KR 20-1998-0051170 U 10/1998
KR 10-2014-0104369 A 8/2014

(Continued)

OTHER PUBLICATIONS

Request for the Submission of an Opinion in Korean Application No. 10-2023-0028932 dated Feb. 17, 2025.

*Primary Examiner* — Shin H Kim
(74) *Attorney, Agent, or Firm* — Quantum Patent Law Firm; Seongyoune Kang

(57) ABSTRACT

Disclosed is a lumbar support device for improvement of exhaust performance, the lumbar support device including a plurality of air bladders, each of the air bladders expanding or contracting, a control valve connected to an air pump configured to provide pneumatic pressure for expansion of the air bladder, wherein the control valve performs a control operation of supplying air supplied from the air pump to the air bladder or discharging the air supplied to the air bladder, and a ventilation blower connected to the control valve, wherein the ventilation blower is selectively driven, when a preset air bladder operation mode is terminated, so as to discharge the air remaining in the air bladder.

8 Claims, 7 Drawing Sheets

(56) References Cited

U.S. PATENT DOCUMENTS

| | | | | |
|---|---|---|---|---|
| 6,088,643 | A * | 7/2000 | Long | A47C 4/54<br>297/284.3 |
| 6,203,105 | B1 * | 3/2001 | Rhodes, Jr. | B60N 2/806<br>297/284.6 |
| 8,616,654 | B2 * | 12/2013 | Zenk | B60N 2/0277<br>297/284.6 |
| 10,315,547 | B2 * | 6/2019 | Shibata | B60N 2/914 |
| 11,945,350 | B2 * | 4/2024 | Mizoi | B60N 2/0284 |
| 2003/0038517 | A1 * | 2/2003 | Moran | B60N 2/914<br>297/284.6 |
| 2010/0289302 | A1 * | 11/2010 | Cheng | B60N 2/914<br>700/282 |
| 2015/0115678 | A1 * | 4/2015 | Hosbach | B60N 2/66<br>297/284.6 |
| 2017/0197523 | A1 * | 7/2017 | Magaña | B60N 2/90 |
| 2017/0368968 | A1 * | 12/2017 | Shibata | B60N 2/914 |
| 2018/0326881 | A1 * | 11/2018 | Patrick | B60N 2/914 |
| 2018/0345823 | A1 * | 12/2018 | Zouzal | B60N 2/0244 |
| 2019/0299829 | A1 | 10/2019 | Strumolo et al. | |
| 2021/0170927 | A1 | 6/2021 | Nageshkar et al. | |
| 2022/0409474 | A1 * | 12/2022 | Kim | A61H 9/0092 |
| 2024/0300393 | A1 * | 9/2024 | Kang | B60N 2/976 |

FOREIGN PATENT DOCUMENTS

| | | | |
|---|---|---|---|
| KR | 10-2015-0077623 | A | 7/2015 |
| KR | 10-2017-0126983 | A | 11/2017 |
| KR | 10-2021-0141077 | A | 11/2021 |

* cited by examiner

FIG. 7

LUMBAR SUPPORT DEVICE FOR IMPROVEMENT OF EXHAUST PERFORMANCE AND CONTROL METHOD THEREOF

CROSS-REFERENCE TO RELATED APPLICATION

This application claims, under 35 U.S.C. § 119(a), the benefit of priority from Korean Patent Application No. 10-2023-0028932, filed on Mar. 6, 2023, the entire contents of which are incorporated herein by reference.

BACKGROUND

(a) Technical Field

The present disclosure relates to a lumbar support device for improvement of exhaust performance and a control method thereof. More particularly, it relates to a lumbar support device for improvement of exhaust performance and a control method thereof configured to quickly discharge air drawn into a plurality of air bladders from the air bladders, thereby preventing a passenger from feeling uncomfortable due to residual air.

(b) Background Art

In general, a driver and a passenger in a vehicle often attach a cushion or other backrests to an existing seat depending on personal preference.

However, since most of the conventionally used cushions have a fixed degree of cushioning, it is difficult to appropriately respond to a body shape, a preference, and the like of a user. Accordingly, in the long term, there is a concern about a side effect caused by a used cushion.

To this end, a plurality of air bladders are built into a seat so that each of the plurality of air bladders is individually adjustable depending on a body shape, a preference, and the like of an occupant, thereby making it possible to implement seat shapes and seat postures that are optimized for the needs of various occupants.

However, although a seat in a vehicle is designed to adjust a degree of cushioning, the degree of cushioning may be adjusted only by pressure through an air intake operation and an air exhaust operation performed by a basic switch. Accordingly, there is a problem in that adjustment of the degree of cushioning by the above-mentioned pressure is not sufficient to reflect various preferences of users.

Additionally, an air control device including a pressure sensor adjusts an amount of air through adjustment of critical pressure. In this case, it is required to provide a pressure sensor control circuit and a separate logic, and there is a problem in that accurate control is not performable due to limitations in environment and sensor performance.

Furthermore, in order to implement step-by-step pressure adjustment, it is required to provide each pressure sensor for each pressure step and, as such, manufacturing costs increase. In some cases, when air bladders are individually adjusted, air may not be sufficiently exhausted from the air bladders only by natural exhaust within a set period of time, which may cause a user to feel uncomfortable due to air remaining in the seat.

The above information disclosed in this Background section is only for enhancement of understanding of the background of the disclosure, and therefore it may contain information that does not form the prior art that is already known in this country to a person of ordinary skill in the art.

SUMMARY OF THE DISCLOSURE

The present device has been made in an effort to solve the above-described problems associated with the prior art, and it is an object of the present disclosure to provide a lumbar support device for improvement of exhaust performance and a control method thereof configured to control a valve so that air is repeatedly drawn into and exhausted from a plurality of air bladders, thereby performing a massage function of a seat. Here, the exhaust side of the valve is connected to a blower of a ventilation seat system, and the blower is controlled to be driven after the massage function of the seat ends. Accordingly, air drawn into the plurality of air bladders is quickly discharged from the air bladders, thereby preventing a passenger from feeling uncomfortable due to air remaining in the seat returned to an initial position thereof.

In one aspect, the present disclosure provides a lumbar support device for improvement of exhaust performance, the lumbar support device including a plurality of air bladders, each of the air bladders expanding or contracting, a control valve connected to an air pump configured to provide pneumatic pressure for expansion of the air bladder, wherein the control valve performs a control operation of supplying air supplied from the air pump to the air bladder or discharging the air supplied to the air bladder, and a ventilation blower connected to the control valve, wherein the ventilation blower is selectively driven, when a preset air bladder operation mode is terminated, so as to discharge the air remaining in the air bladder.

In a preferred embodiment, the control valve may include a first connection part connected to the air bladder and configured to form a supply path for the air supplied from the air pump, and a second connection part disposed opposite the first connection part, connected to the ventilation blower, and configured to form a discharge path for the air discharged from the air bladder.

In another preferred embodiment, the ventilation blower may be preinstalled to drive a ventilation system mounted in a seat.

In still another preferred embodiment, the ventilation blower may be configured to be selectively driven when the air is discharged from the air bladder in the air bladder operation mode.

In yet another preferred embodiment, the air bladder operation mode may be set to repeatedly open and close the control valve so that the air is alternately supplied to or discharged from the plurality of neighboring air bladders for a set period of time.

In another aspect, the present disclosure provides a control method of a lumbar support device for improvement of exhaust performance, the control method including a first step of controlling, when a preset air bladder operation mode is driven from an initial position of an air bladder, opening and closing of a control valve so that air supplied from an air pump is supplied to the air bladder or the air supplied to the air bladder is discharged, a second step of determining, when the air bladder operation mode is driven for a set period of time, whether the air bladder operation mode is terminated, a third step of discharging, upon determining that the air bladder operation mode is terminated, the air remaining in the air bladder by driving of a ventilation blower, and a fourth step of stopping the driving of the ventilation blower and supplying the air from the air pump to the air bladder so that the air bladder is returned to an initial position thereof.

In a preferred embodiment, in the fourth step, a first connection part may be opened to allow the air to be supplied to the air bladder through a supply path in a state in which a discharge path is blocked by blocking a second connection part of the control valve.

In another preferred embodiment, in the fourth step, the air may be supplied to the air bladder through the supply path for a set period of time so that the air bladder is returned to the initial position.

In still another preferred embodiment, in the second step, when the air bladder operation mode is driven for the set period of time, the air in the air bladder may be discharged so as to selectively drive the ventilation blower.

Other aspects and preferred embodiments of the present device are discussed infra.

It is understood that the terms "vehicle", "vehicular", and other similar terms as used herein are inclusive of motor vehicles in general, such as passenger automobiles including sport utility vehicles (SUV), buses, trucks, various commercial vehicles, watercraft including a variety of boats and ships, aircraft, and the like, and include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example, vehicles powered by both gasoline and electricity.

The above and other features of the present device are discussed infra.

BRIEF DESCRIPTION OF THE DRAWINGS

The above and other features of the present device will now be described in detail with reference to certain exemplary embodiments thereof illustrated in the accompanying drawings which are given hereinbelow by way of illustration only, and thus are not limitative of the present disclosure, and wherein:

FIG. 7 is a diagram sequentially showing a control method of a lumbar support device for improvement of exhaust performance according to another embodiment of the present device.

Figure 1:
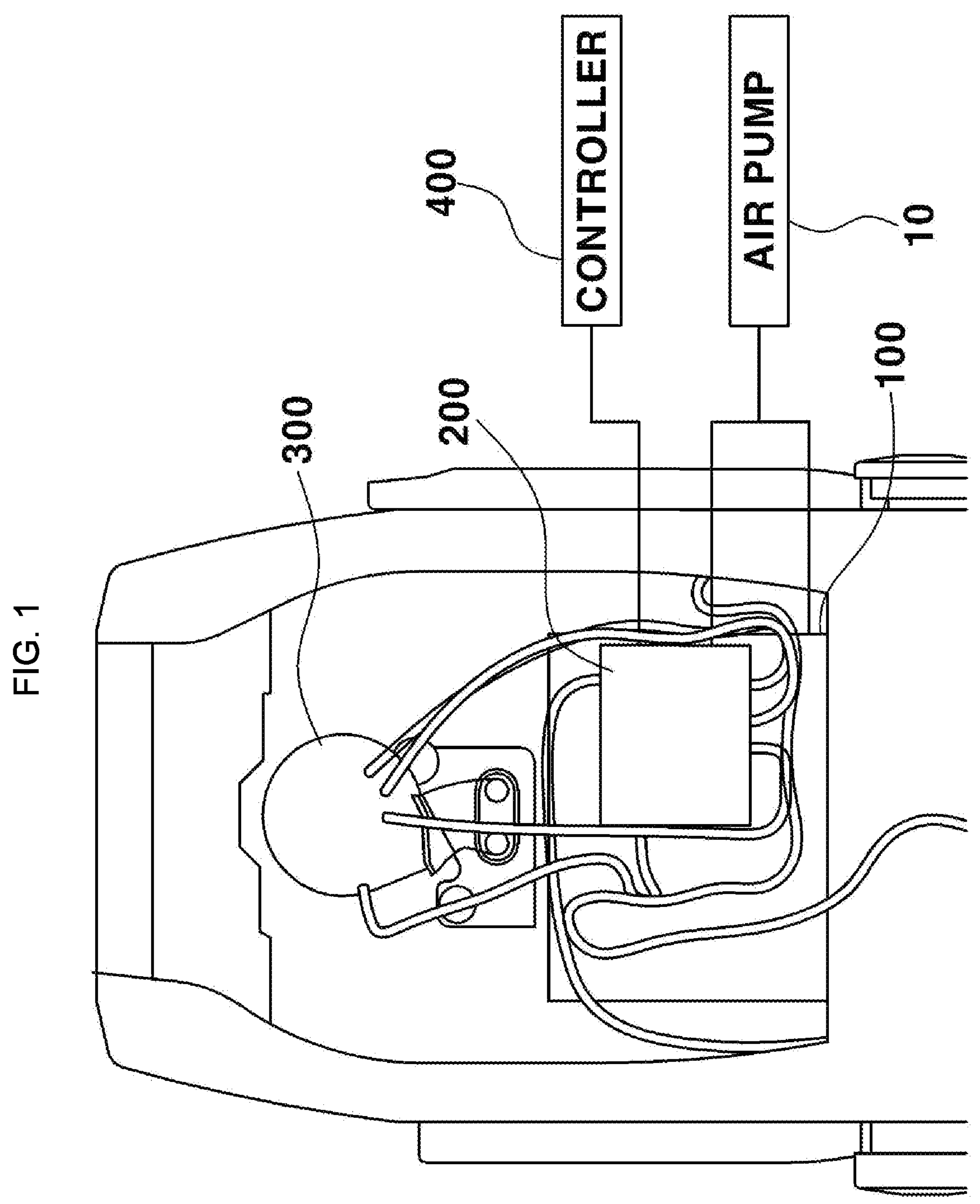
FIG. 1 is a diagram schematically showing a lumbar support device for improvement of exhaust performance according to an embodiment of the present device.

Reference numerals set forth in the Drawings include reference to the following elements as further discussed below:

1: Lumbar support
2: Bolster

-continued

3: Cushion
10: Air pump
100: Air bladder
200: Control valve
210: First connection part
220: Second connection part
300: Ventilation blower
400: Controller It should be understood that the appended drawings are not necessarily to scale, presenting a somewhat simplified representation of various preferred features illustrative of the basic principles of the present device. The specific design features of the present device as disclosed herein, including, for example, specific dimensions, orientations, locations, and shapes will be determined in part by the particular intended application and use environment.

In the figures, reference numbers refer to the same or equivalent parts of the present device throughout the several figures of the drawing.

DETAILED DESCRIPTION

Hereinafter, reference will be made in detail to various embodiments of the present device, examples of which are illustrated in the accompanying drawings and described below.

Advantages and features of the present device and a method of achieving the same will become more apparent with reference to the embodiments described below in detail and the accompanying drawings.

While the present device will be described in conjunction with exemplary embodiments, it will be understood that the present description is not intended to limit the present device to the exemplary embodiments. On the contrary, the present disclosure is intended to cover not only the exemplary embodiments, but also various alternatives, modifications, equivalents, and other embodiments, which may be included within the spirit and scope of the present device as defined by the appended claims.

In describing the embodiments disclosed herein, when it is determined that a detailed description of publicly known techniques to which the present device pertains may obscure the gist of the present disclosure, detailed description thereof will be omitted.

Figure 2:
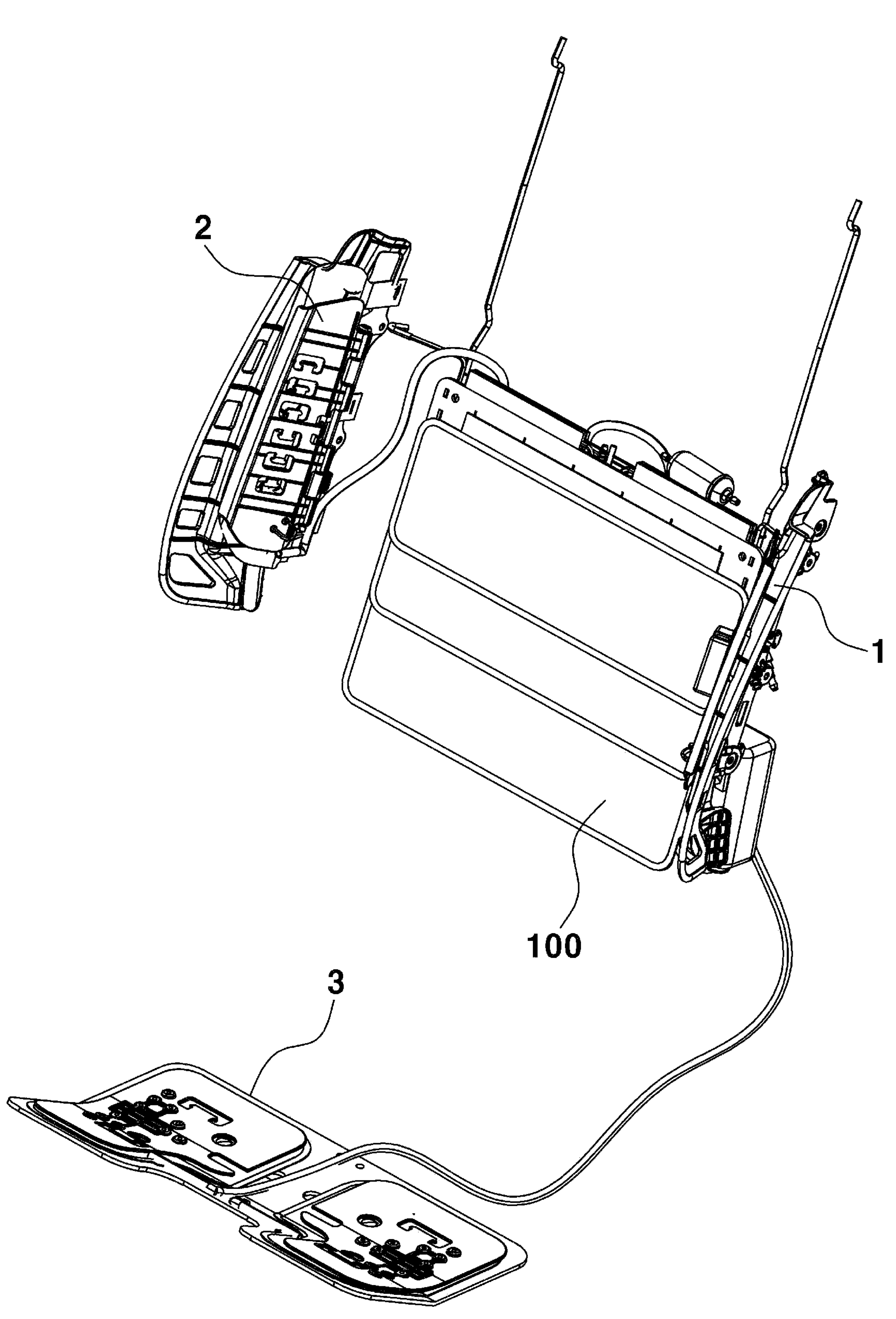
FIG. 2 is a diagram showing an air bladder in the lumbar support device for improvement of exhaust performance according to the embodiment of the present device.

FIG. 1 is a diagram schematically showing a lumbar support device for improvement of exhaust performance according to an embodiment of the present device, and FIG. 2 is a diagram showing an air bladder in the lumbar support device for improvement of exhaust performance according to the embodiment of the present device.

Figure 3:
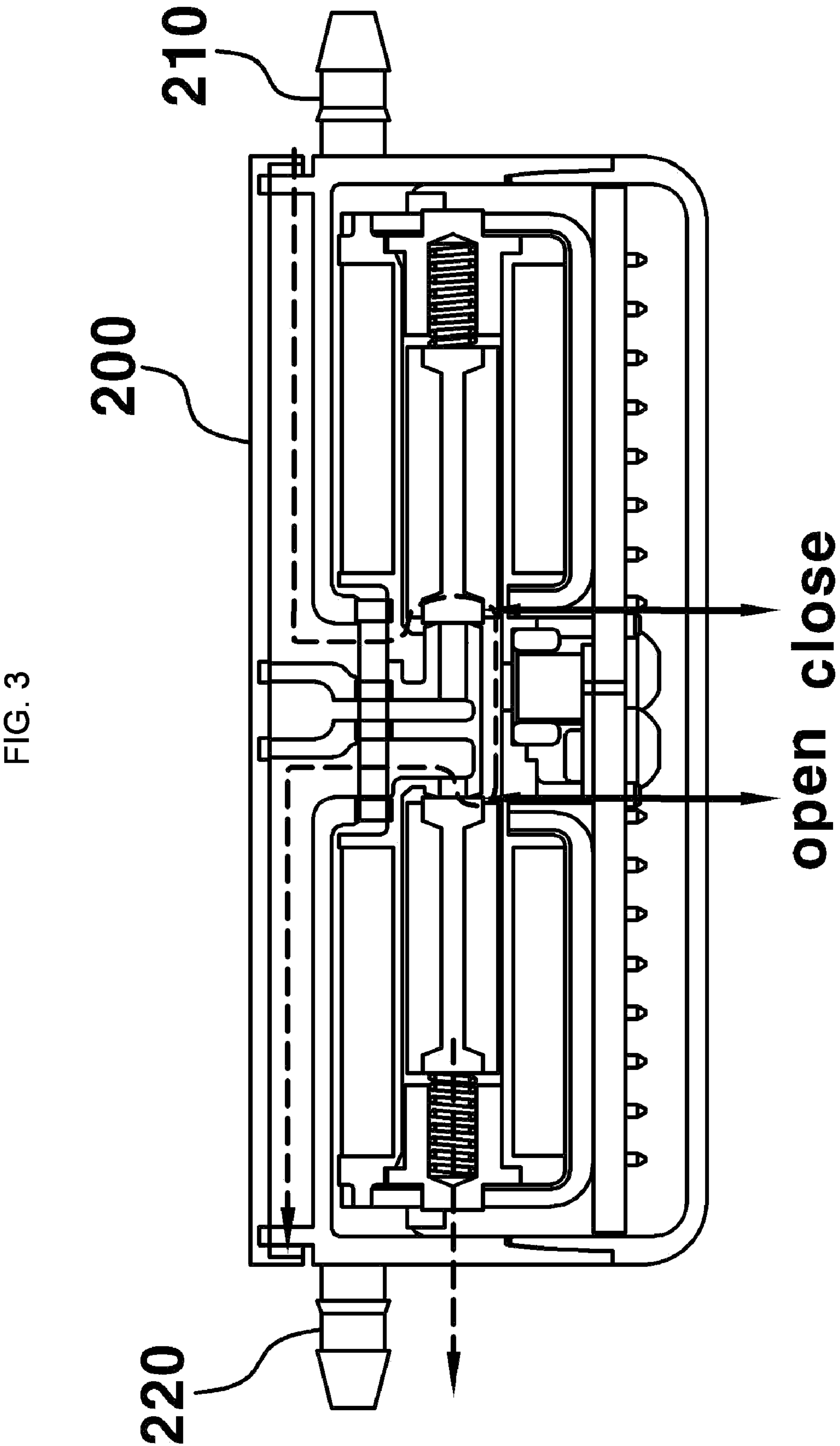
FIG. 3 is a diagram showing a control valve in the lumbar support device for improvement of exhaust performance according to the embodiment of the present device.
Figure 4:
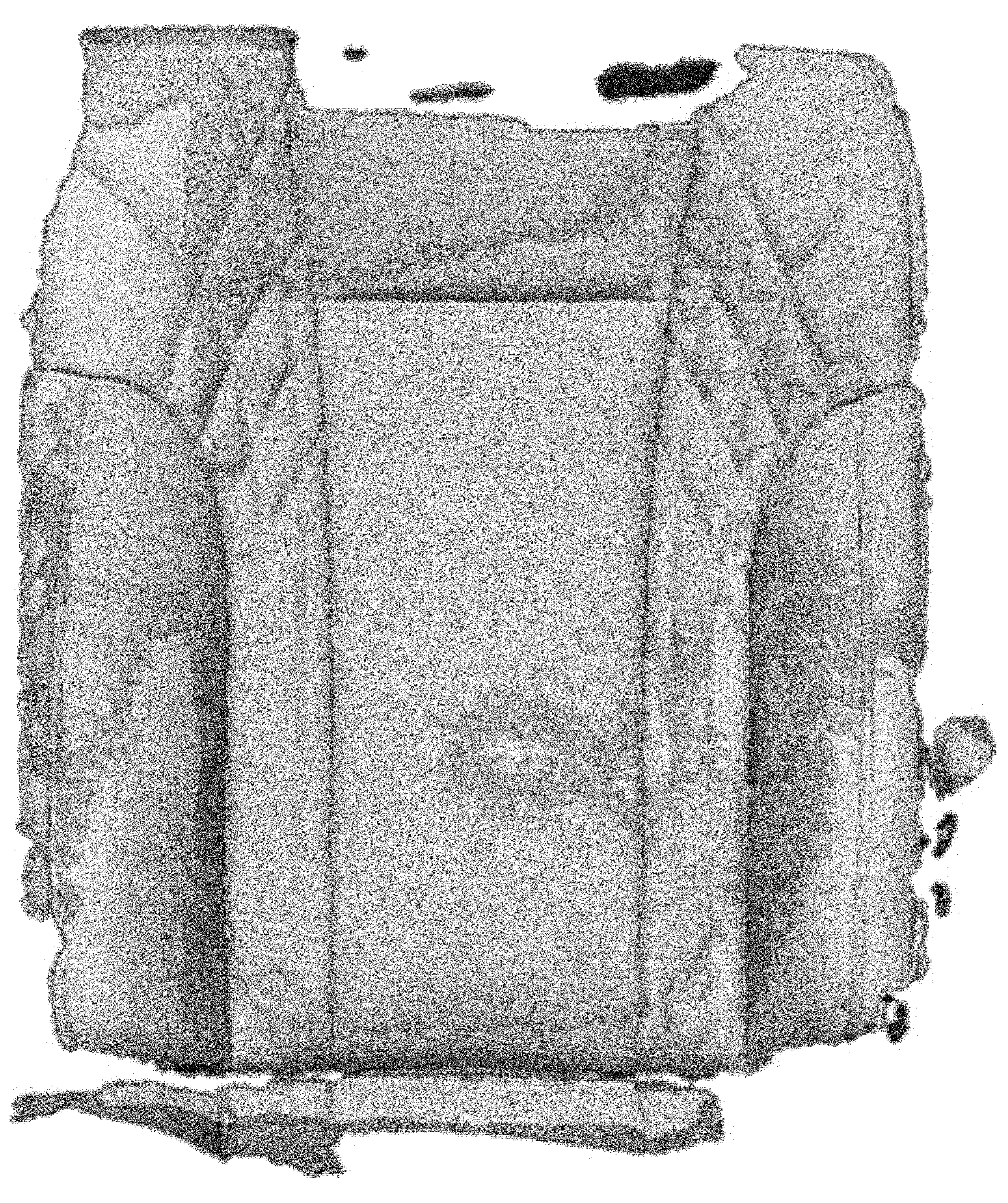
FIG. 4 is a diagram showing a residual air amount of a seat in the lumbar support device for improvement of exhaust performance according to the embodiment of the present device.
Figure 5:
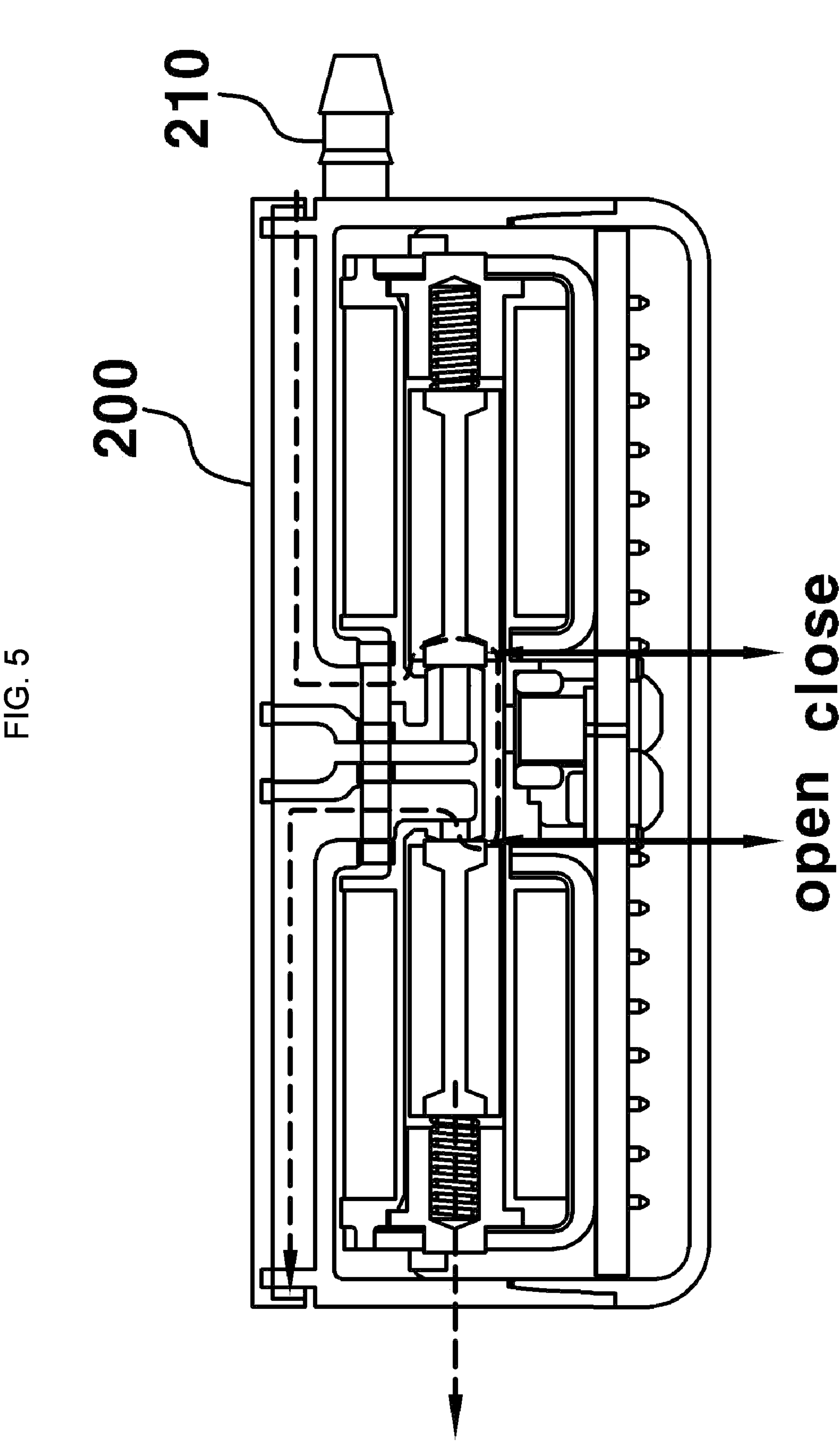
FIGS. 5 and 6 are diagrams showing a conventional control valve and a residual air amount of a seat in the lumbar support device for improvement of exhaust performance according to the embodiment of the present device.
Figure 6:
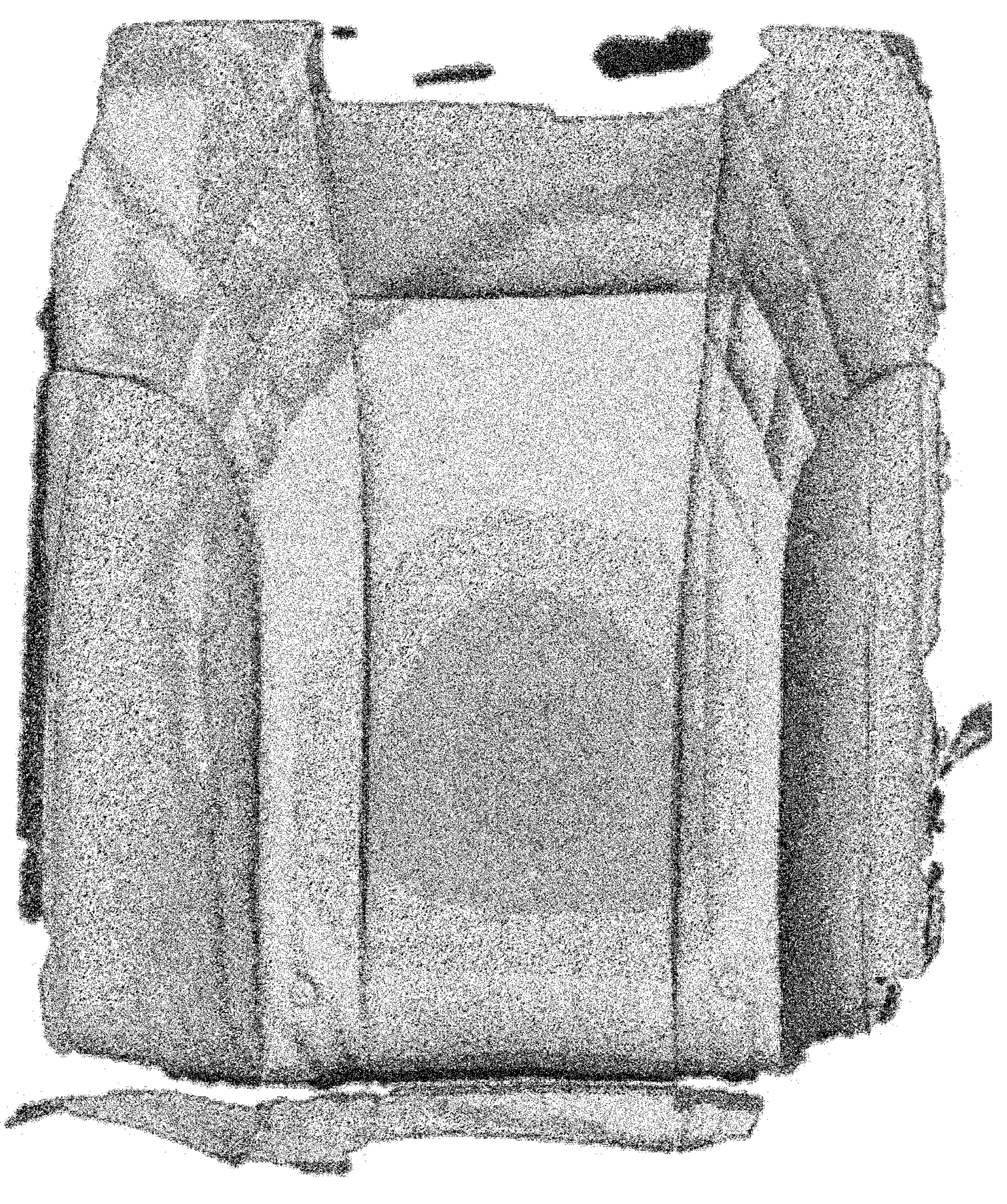

FIG. 3 is a diagram showing a control valve in the lumbar support device for improvement of exhaust performance according to the embodiment of the present device, FIG. 4 is a diagram showing a residual air amount of a seat in the lumbar support device for improvement of exhaust performance according to the embodiment of the present device, and FIGS. 5 and 6 are diagrams showing a conventional control valve and a residual air amount of a seat in the lumbar support device for improvement of exhaust performance according to the embodiment of the present device.

As shown in FIGS. 1 and 2, the lumbar support device for improvement of exhaust performance according to the embodiment includes an air bladder 100, a control valve 200, and a ventilation blower 300.

The air bladder 100 is configured to expand when air is supplied thereto. Here, the air bladders 100 are respectively provided in a lumbar support 1, a bolster 2, and a cushion 3 forming the seat. Further, each of the lumbar support 1, the bolster 2, and the cushion 3 is formed to selectively expand or contract depending on the body shape of a user.

The air bladders 100 are arranged in plural number on the lumbar support 1 and selectively expand or contract, thereby securing a support section for the lower back of a user and having a function of alleviating back fatigue. Accordingly, comfort performance may be improved.

Recently, air is repeatedly drawn into and exhausted from the air bladder 100, thereby providing a user with a massage function of a seat.

However, in the case of automatic intake and exhaust of the cushion 3, a pressure sensor is provided in the cushion 3. Here, in the process of repeatedly performing an air intake operation and an air exhaust operation, when the air intake operation is performed so that the cushion 3 is returned to the previous position thereof, it is possible to reach a set level of air volume even if there is residual air in the air bladder 100. However, since the air bladder 100 of the lumbar support 1, in which the pressure sensor is not provided, performs an air intake operation and an air exhaust operation only for a set period of time, air may not be sufficiently drawn into or exhausted from the air bladder of the lumbar support 1. In some cases, a user may feel that residual air is still present in the air bladder 100 after the air exhaust operation is completed (refer to FIG. 6).

Here, as shown in FIG. 5, an air exhaust speed may not be high enough to completely exhaust air remaining in the air bladder 100 for the set period of time. Accordingly, all the residual air in the air bladder 100 may not be completely exhausted by natural exhaust performed by appropriately opening and closing a control valve 200 formed of a solenoid valve.

As described, when residual air remains in the air bladder 100, air is not sufficiently drawn into the air bladder 100 after air is exhausted from the air bladder 100 and, as such, it is not possible to provide a strong amount of protrusion to a cushion of a user. Furthermore, there may be a problem in which, after air is drawn into the air bladder 100, air is additional supplied to the air bladder 100.

To this end, the control valve 200 includes a first connection part 210 and a second connection part 220, as shown in FIG. 3. Here, the first connection part 210 is connected to an air pump 10 that provides pneumatic pressure for expansion of the air bladder 100, and the second connection part 220 is connected to the ventilation blower 300 configured to exhaust air from the air bladder 100.

That is, upon receiving a request for a massage function from a user, a controller 400 controls the control valve 200 to open a supply path so that air supplied from the air pump 10 is repeatedly supplied to the air bladder 100 through the first connection part 210. Further, the controller 400 controls the control valve 200 to open an exhaust path so that air supplied to the air bladder 100 is discharged from the air bladder 100. In this case, since the second connection part 220 is connected to the ventilation blower 300, air is quickly exhausted from the air bladder 100 along the exhaust path by driving of the ventilation blower 300.

Preferably, the second connection part 220 is disposed opposite the first connection part 210 and is connected to the ventilation blower 300, thereby forming the exhaust path configured to enable air discharged from the air bladder 100 to be selectively discharged along the ventilation blower 300 side.

Meanwhile, when a preset air bladder operation mode is terminated, the ventilation blower 300 is selectively driven to discharge residual air in the air bladder 100.

More specifically, when residual air in the air bladder 100 is exhausted through natural exhaust as in the past, an air exhaust speed is not high enough to completely exhaust air remaining in the air bladder 100 (refer to FIG. 6). For this reason, after the air bladder operation mode ends, the ventilation blower 300 is operated for a set period of time so as to forcibly exhaust air remaining in the air bladder 100, thereby making it possible to completely exhaust residual air in the air bladder 100, as shown in FIG. 4.

In this case, when air is completely exhausted from the air bladder 100, air is supplied for a set period of time through the air pump 10 in a state in which the second connection part 220 is blocked. In this manner, each of the plurality of air bladders 100 may draw an amount of air corresponding to an amount of air before the air bladder operation mode is performed. Accordingly, as in the related art, after the air bladder operation mode such as a massage function is completed and the air bladder is returned to an initial position thereof, the air bladder 100 is operated to sufficiently draw air at an original level, thereby preventing a problem of additionally supplying air to the air bladder 100.

In addition, the controller 400 may perform a control operation to repeatedly drive the ventilation blower 300 in the air bladder operation mode, thereby rapidly exhausting air through the exhaust path. More specifically, the ventilation blower 300 is momentarily driven to generate a sharp pressure difference between the air bladder 100 having air to be exhausted and the ventilation blower 300, thereby making it possible to exhaust air in the air bladder 100 at a high speed.

That is, for example, the air bladder operation mode may be a massage mode, and may be set to a mode in which the control valve 200 is repeatedly opened and closed so that air is alternately supplied to or discharged from a plurality of neighboring air bladders 100 for a set period of time.

In other words, the air bladder operation mode may be set to a mode in which, when expansion is achieved in the upper air bladder 100 by controlling opening and closing of the control valve 200 and controlling air to be drawn into the upper air bladder 100 among the plurality of air bladders 100 respectively arranged at an upper position, a middle position, and a lower position, air exhaust control is performed on the middle air bladder 100, and when expansion is achieved again in the middle air bladder 100 by controlling opening and closing of the control valve 200 and controlling air to be drawn into the middle air bladder 100, air exhaust control is performed on the lower air bladder 100.

When the ventilation blower 300 is momentarily and repeatedly driven through the controller 400 in the process of repeatedly performing exhaust control in this manner, air is rapidly exhausted from each of the plurality of air bladders 100 in the air bladder operation mode by driving of the ventilation blower 300. Accordingly, it is possible to clearly distinguish between the respective positions of the plurality of air bladders 100 configured to perform an air intake operation and an air exhaust operation and respectively arranged at an upper position, a middle position, and a lower position, thereby effectively providing a user with a massage function according to the air bladder operation mode.

Figure 7:
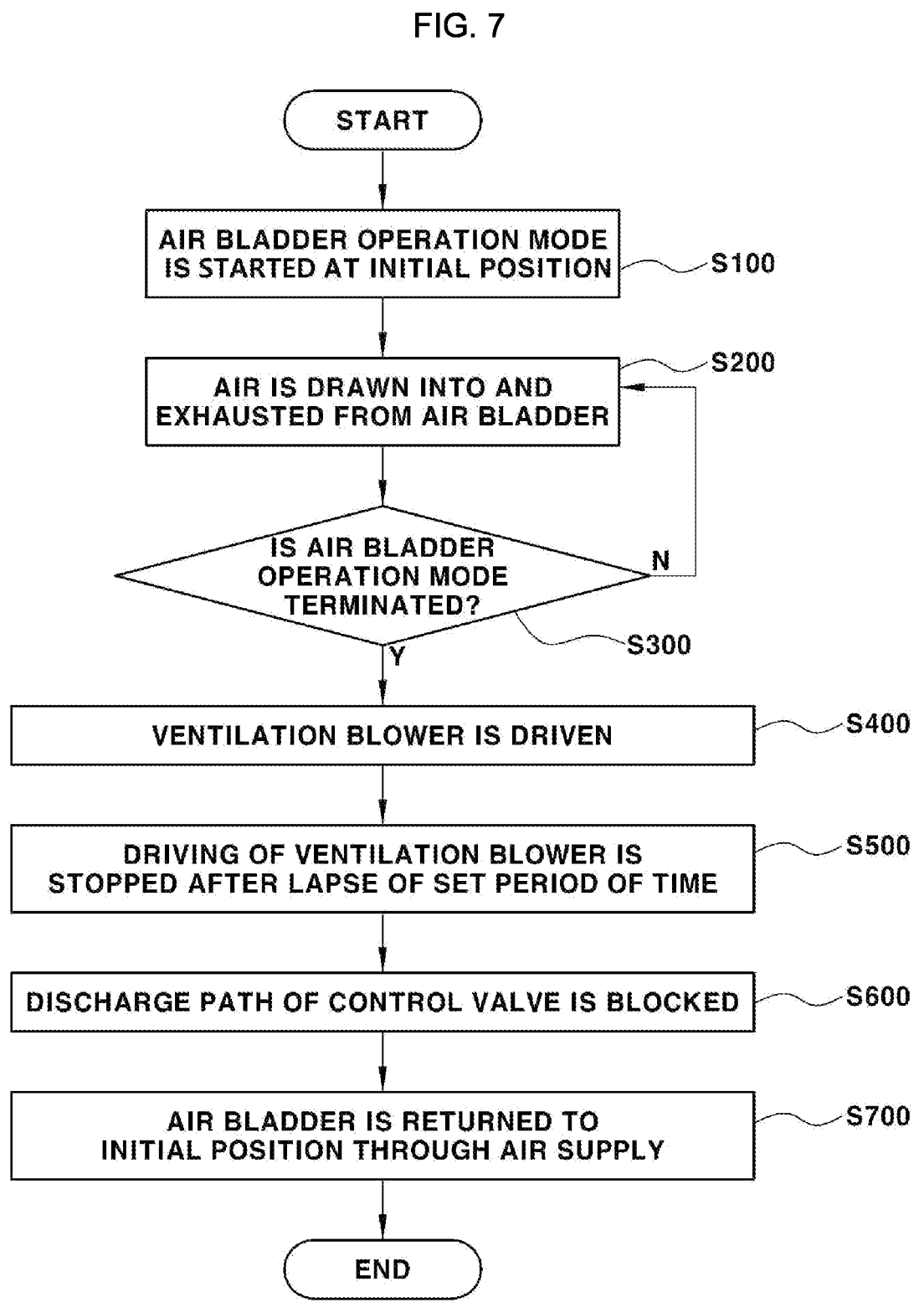

Hereinafter, FIG. 7 is a diagram sequentially showing a control method of a lumbar support device for improvement of exhaust performance according to another embodiment of the present device.

As shown in FIG. 7, the control method of the lumbar support device for improvement of exhaust performance according to the present embodiment will be sequentially described as follows.

First, when an air bladder operation mode is requested by a user input at an initial position of the plurality of air bladders 100, the control valve 200 is controlled to be opened and closed by the controller 400 (S100).

Here, the air bladder operation mode may be a massage mode as an example, and the control valve 200 is repeatedly opened and closed so that air is alternately supplied to or discharged from a plurality of neighboring air bladders 100 for a set period of time (S200).

In other words, the air bladder operation mode may be set to a mode in which, when expansion is achieved in the upper air bladder 100 by controlling opening and closing of the control valve 200 and controlling air to be drawn into the upper air bladder 100 among the plurality of air bladders 100 respectively arranged at an upper position, a middle position, and a lower position, air exhaust control is performed on the middle air bladder 100, and when expansion is achieved again in the middle air bladder 100 by controlling opening and closing of the control valve 200 and controlling air to be drawn into the middle air bladder 100, air exhaust control is performed on the lower air bladder 100.

After the set period of time has elapsed, when it is determined that the air bladder operation mode has ended (S300), the ventilation blower 300 is driven by the controller 400 (S400), and the second connection part 220 of the control valve 200 is opened to discharge air remaining in the air bladder 100.

Here, unlike the bolster 2 and the cushion 3, the air bladder 100 of the lumbar support 1 is not provided with a pressure sensor. In this case, after an air intake operation and an air exhaust operation are performed for a set period of time, air may not be sufficiently exhausted during the air exhaust operation. In some cases, a user may feel that residual air still remains in the air bladder 100 (refer to FIG. 6).

The reason for this is that residual air in the air bladder 100 is to be completely exhausted through natural exhaust performed by controlling opening and closing of the control valve 200 formed of a solenoid valve, but an air exhaust speed may not be high enough to completely exhaust air in the air bladder 100 for a set period of time.

As described above, when residual air remaining in the air bladder 100 after an air exhaust operation is performed, air is not sufficiently drawn into the air bladder 100 during an air intake operation and, as such, it is not possible to provide a strong amount of protrusion to a cushion of a user. Furthermore, when air is drawn into the air bladder 100, air may be additionally supplied to the air bladder 100 in a state in which residual air still remains in the air bladder 100. In this case, the ventilation blower 300 is driven to quickly exhaust air from the air bladder 100, thereby preventing the above-described problem.

Thereafter, after the lapse of the set period of time during which the ventilation blower 300 is driven, driving of the ventilation blower 300 is stopped (S500), and the controller 400 controls the control valve 200 so as to block the second connection part 220 connected to the ventilation blower 300 (S600).

That is, when air is completely exhausted from the air bladder 100, air is supplied to the air bladder 100 through the air pump 10 for a set period of time in a state in which the second connection part 220 is blocked. In this manner, each of the plurality of air bladders 100 may draw an amount of air corresponding to an amount of air before the air bladder operation mode is performed (S700). Accordingly, after the air bladder operation mode such as a massage function is completed and the air bladder is returned to an initial position thereof, the air bladder 100 is operated to sufficiently draw air at an original level, thereby making it possible to prevent a problem of additionally supplying air to the air bladder 100.

Meanwhile, in the present embodiment, although it has been described that the ventilation blower 300 is selectively driven when the air bladder operation mode is stopped, the ventilation blower 300 may be repeatedly driven in the process of performing the air bladder operation mode.

More specifically, when performing the air bladder operation mode in which an air intake operation and an air exhaust operation are repeatedly performed in the plurality of air bladders 100, the controller 400 performs a control operation to repeatedly drive the ventilation blower 300 so that air is exhausted from the air bladders 100, thereby rapidly exhausting air through the exhaust path. As a result, the ventilation blower 300 is momentarily driven to generate a sharp pressure difference between the air bladder 100 having air to be exhausted and the ventilation blower 300, thereby making it possible to exhaust air in the air bladder 100 at a high speed.

Accordingly, by driving the ventilation blower 300 as described above, air may be alternately exhausted from the plurality of air bladders 100 in the air bladder operation mode, thereby making it possible to clearly distinguish between the plurality of air bladders 100 in which an air exhaust operation and an air intake operation are repeatedly performed. Accordingly, it is possible to effectively provide a user with a massage function according to the air bladder operation mode.

According to the present device, a massage function of a seat is performed by controlling a valve so that air is repeatedly drawn into and exhausted from a plurality of air bladders. Here, the exhaust side of the valve is connected to a blower of a ventilation seat system, and the blower is controlled to be driven after the massage function of the seat ends. Accordingly, air drawn into the plurality of air bladders is quickly discharged from the air bladders, thereby having an effect of preventing a passenger from feeling uncomfortable due to air remaining in the seat returned to an initial position thereof.

Accordingly, in the present device, since the same amount of air is drawn into the seat returned to the initial position thereof for a set period of time, the seat is accurately returned to an original state thereof after the massage seat function ends, thereby having an effect of maximally improving comfort performance of the seat and quality thereof.

Additionally, in the present device, since air remaining in the plurality of air bladders is completely exhausted, it is not necessary to install a separate pressure sensor to check residual air. Accordingly, the number of components is reduced, thereby having an effect of reducing manufacturing costs.

As is apparent from the above description, according to the present device, a valve is controlled so as to allow air to be repeatedly drawn into and exhausted from a plurality of air bladders, thereby performing a massage function of a seat. Here, the exhaust side of the valve is connected to a blower of a ventilation seat system, and the blower is controlled to be driven after the massage function of the seat ends. Accordingly, air drawn into the plurality of air bladders is quickly discharged from the air bladders, thereby preventing a passenger from feeling uncomfortable due to air remaining in the seat returned to an initial position thereof.

As a result, according to the present device, since the same amount of air may be drawn into the seat returned to an initial position thereof for a set period of time, the seat is accurately returned to an original state thereof after the massage function of the seat ends, thereby having an effect of maximally improving comfort performance of the seat and quality thereof.

Additionally, according to the present device, since air remaining in the plurality of air bladders is completely exhausted, it is not necessary to install a separate pressure sensor to check residual air. Consequently, the number of components is reduced, thereby having an effect of reducing manufacturing costs.

The present device has been described in detail with reference to preferred embodiments shown in the drawings, but the embodiments are merely illustrative. It will be appreciated by those skilled in the art that various modifications may be made from the embodiments, and all or a part of the embodiments may be selectively combined with each other. Therefore, the true technical protection scope of the present device should be defined by the technical spirit of the appended claims.

What is claimed is:

1. A lumbar support device for a seat, the lumbar support device comprising:

at least one air bladder that is expandable or contractable;

a control valve connected to an air pump configured to provide pneumatic pressure for expansion of the at least one air bladder, the control valve configured to perform a control operation of supplying air to be supplied from the air pump to the at least one air bladder or discharging the air supplied to the at least one air bladder; and a ventilation blower connected to the control valve, wherein the ventilation blower is selectively driven, when a preset air bladder operation mode is terminated, so as to discharge the air remaining in the at least one air bladder, wherein the control valve comprises:

a first connection part connected to the at least one air bladder and configured to form a supply path for the air supplied from the air pump; and a second connection part disposed opposite the first connection part, connected to the ventilation blower, and configured to form a discharge path for the air to be discharged from the at least one air bladder.

2. The lumbar support device of claim 1, wherein the ventilation blower is preinstalled.

3. The lumbar support device of claim 1, wherein the ventilation blower is configured to be selectively driven to discharge the air from the at least one air bladder in the air bladder operation mode.

4. The lumbar support device of claim 1, wherein the air bladder operation mode is set to repeatedly open and close the control valve so that the air is alternately supplied to or discharged from the at least one air bladder for a set period of time.

5. A control method of a lumbar support device for a seat, the control method comprising:

controlling, when a preset air bladder operation mode is started from an initial position of an air bladder, opening and closing of a control valve so that air supplied from an air pump is supplied to the air bladder or the air supplied to the air bladder is discharged;

determining, when the air bladder operation mode is maintained for a set period of time, whether to terminate the air bladder operation mode;

discharging, upon determining that the air bladder operation mode is to be terminated, the air remaining in the air bladder by driving of a ventilation blower; and stopping the driving of the ventilation blower and supplying the air from the air pump to the air bladder so that the air bladder is returned to the initial position thereof.

6. The control method of claim 5, wherein, during the stopping, a first connection part of the control valve is opened to allow the air to be supplied to the air bladder through a supply path in a state in which a discharge path is blocked by blocking a second connection part of the control valve.

7. The control method of claim 6, wherein, during the stopping, the air is supplied to the air bladder through the supply path for a set period of time so that the air bladder is returned to the initial position.

8. The control method of claim 5, wherein, during the determining, when the air bladder operation mode is maintained for the set period of time, the ventilation blower is selectively driven to discharge the air in the air bladder.

* * * * *